(12) United States Patent
Puckett et al.

(10) Patent No.: US 10,359,650 B1
(45) Date of Patent: Jul. 23, 2019

(54) APPARATUSES AND METHODS FOR LOW ENERGY DATA MODULATION

(71) Applicant: Honeywell International Inc., Morris Plains, NJ (US)

(72) Inventors: Matthew Wade Puckett, Scottsdale, AZ (US); Neil Krueger, Saint Paul, MN (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 15/956,610

(22) Filed: Apr. 18, 2018

Related U.S. Application Data (60) Provisional application No. 62/620,094, filed on Jan. 22, 2018.

(51) Int. Cl.
| | | |
|---|---|---|
| *G02F 1/01* | (2006.01) | |
| *G02B 6/124* | (2006.01) | |
| *G02B 6/12* | (2006.01) | |
| *H04B 10/50* | (2013.01) | |
| *H04B 10/548* | (2013.01) | |

(52) U.S. Cl.
CPC .............. *G02F 1/011* (2013.01); *G02B 6/124* (2013.01); *G02B 2006/12104* (2013.01); *G02B 2006/12107* (2013.01); *G02B 2006/12142* (2013.01); *G02F 2201/307* (2013.01); *H04B 10/505* (2013.01); *H04B 10/548* (2013.01)

(58) Field of Classification Search
None
See application file for complete search history.

(56) References Cited

U.S. PATENT DOCUMENTS

| | | | |
|---|---|---|---|
| 7,532,384 B2 | 5/2009 | Bermel et al. | |
| 2005/0089257 A1 | 4/2005 | Barrios et al. | |
| 2010/0329608 A1* | 12/2010 | Ogawa | G02B 6/124 385/37 |
| 2017/0059779 A1* | 3/2017 | Okayama | G02B 6/29397 |

(Continued)

OTHER PUBLICATIONS

Fink, "Thesis presented to the Faculty of the Graduate College at the University of Nebraska, "Ultrasonic Detection Using π-Phase-Shifted Fiber Bragg Gratings"", "http://digitalcommons.unl.edu/elecengtheses/44", Dated Nov. 2012, pp. Cover, 2-51.

(Continued)

*Primary Examiner* — Jerry Rahll
(74) *Attorney, Agent, or Firm* — Fogg & Powers LLC

(57) ABSTRACT

A method is provided. The method comprises: injecting an optical carrier signal into an unbent optical waveguide between two reflectors, where the distance between two reflectors in the center of the two reflectors is substantially zero and the two reflectors undergo substantially a π phase shift where the two reflectors are adjacent; creating standing waves between the two reflectors in the center, and a single resonance due to constructive interference; applying a varying electric field across the unbent optical waveguide centered between two reflectors and extending a length less than or equal to a combined length of the two reflectors; and generating a modulated carrier signal at at least one of an input and an output of the unbent optical waveguide between the two reflectors.

14 Claims, 8 Drawing Sheets

(56) References Cited

U.S. PATENT DOCUMENTS

2017/0170631 A1* 6/2017 Chimot ............... H01S 5/06258
2018/0059328 A1* 3/2018 Shi ..................... G02B 6/12007

OTHER PUBLICATIONS

Verber, "Applications of Electro-Optic Gratings in Integrated Optical Signal Processing Devices", "https://ntrs.nasa.gov/search.jsp?R=19820008037 2018-03-09T15:12:41+00:00Z", Retrieved Mar. 9, 2018, pp. 209-215.

Wang et al, "Nanophotonic Lithium Niobate Electro-optic Modulators", "Optics Express", Dated Jan. 22, 2018, pp. 1547-1555, vol. 26, No. 2, Publisher: Optical Society of America.

Wooten et al, "A Review of Lithium Niobate Modulators for Fiber-Optic Communications Systems", "IEEE Journal of Selected Topics in Quantum Electronics", Dated Jan./Feb. 2000, pp. 69-82, vol. 6, No. 1, Publisher: IEEE.

Ying et al, "Ultra-smooth Lithium Niobate Photonic Microstructures by Surface Tension Reshaping", "Optics Express", Dated May 24, 2010, pp. 11508-11513, vol. 18, No. 11, Publisher: Optical Society of America.

Zhang et al, "Monolithic Ultra-high-Q Lithium Niobate Microring Resonator", "Optica", Dated Dec. 2007, pp. 1536-1537, vol. 4, No. 12, Publisher: Optical Society of America.

* cited by examiner

APPARATUSES AND METHODS FOR LOW ENERGY DATA MODULATION

CROSS-REFERENCE TO RELATED APPLICATIONS

This application claims benefit of U.S. Provisional Application Ser. No. 62/620,094, filed Jan. 22, 2018, and titled "Apparatuses and Methods for Low Energy Data Modulation," which is incorporated herein by reference in it entirety.

BACKGROUND

Electro-optical modulators convert data in the electrical domain to modulated data in the optical domain. This is desirable when one or more channels of high speed, or broadband data, need to be transmitted between two locations. However, conventional electro-optical modulators, e.g. using ring resonators or Mach-Zehnder interferometers, require relatively high energy to perform such conversion due to the inability to reduce the size of such conventional modulators. When many electro-optical modulators are used, e.g. in parallel, energy consumption may increase geometrically.

Although it is always desirable to reduce energy consumption, it is particularly desirable to do so in low temperature systems. Some energy used for modulation may be dissipated as heat which can detrimentally affect the performance of low temperature circuits.

Quantum computers using low temperature circuits require many high bandwidth data connections, e.g. using optical signals. Quantum computers are typically operated at very low temperatures, e.g. at cryogenic temperatures approaching zero Kelvin. Dissipated heat can detrimentally affect the stability, and thus the performance, of a quantum computer. Therefore, there is a need to for electro-optical modulators that operate with diminished energy levels.

SUMMARY

A method is provided. The method comprises: injecting an optical carrier signal into an unbent optical waveguide between two reflectors, where the distance between two reflectors in the center of the two reflectors is substantially zero and the two reflectors undergo substantially a $\pi$ phase shift where the two reflectors are adjacent; creating standing waves between the two reflectors in the center, and a single resonance due to constructive interference; applying a varying electric field across the unbent optical waveguide centered between two reflectors and extending a length less than or equal to a combined length of the two reflectors; and generating a modulated carrier signal at at least one of an input and an output of the unbent optical waveguide between the two reflectors.

DRAWINGS

Understanding that the drawings depict only exemplary embodiments and are not therefore to be considered limiting in scope, the exemplary embodiments will be described with additional specificity and detail through the use of the accompanying drawings, in which:

FIG. 5A-1 illustrates a plan view of one embodiment of a modified Bragg resonator;

FIG. 5A-2 illustrates a plot of one embodiment of a reflection spectrum for a first modified Bragg resonator;

FIG. 5B-1 illustrates a plan view of another embodiment of a modified Bragg resonator;

FIG. 5B-2 illustrates a plot of one embodiment of a reflection spectrum for a second modified Bragg resonator;

In accordance with common practice, the various described features are not drawn to scale but are drawn to emphasize specific features relevant to the exemplary embodiments. Reference characters denote like elements throughout figures and text.

DETAILED DESCRIPTION

In the following detailed description, reference is made to the accompanying drawings that form a part hereof, and in which is shown by way of illustration specific illustrative embodiments. However, it is to be understood that other embodiments may be utilized and that structural, mechanical, and electrical changes may be made. Furthermore, the method presented in the drawing figures and the specification is not to be construed as limiting the order in which the individual steps may be performed. The following detailed description is, therefore, not to be taken in a limiting sense.

An electro-optical modulator including a modified Bragg resonator may be used to overcome the above referenced problem. Embodiments of the electro-optical modulator including a Bragg resonator have at least one advantage. The electro-optical modulator including a modified Bragg resonator requires at least an order of magnitude less energy, on the order of atto Joules, to modulate a bit of data on an optical carrier in comparison to conventional techniques. When a modulator requires less energy to modulate a signal, it is deemed to have higher modulation efficiency.

The reduction in energy occurs because the electro-optical modulator including a modified Bragg resonator can be implemented with a smaller 'foot print', for example of having a length on the order of 10 microns. As a result, smaller electrodes—which correspondingly have less capacitance, and thus require a diminished amount of energy for modulation—can be used. Further, reducing the operating wavelength of the modulator can also reduce the energy required for modulation by allowing further miniaturization.

The modified Bragg modulator is implemented with non-linear electro-optical material. Depending upon the type of such non-linear electro-optical material and the critical dimension of the lithography used to manufacture the electro-optical modulator including a modified Bragg resonator, an optical source emitting an optical signal with a wavelength (e.g. as low as 1064 nm or 780 nm, or even a lower wavelength) may be used in the corresponding modulation system.

"Non-linear electro-optical material" means material having a index of refraction higher than cladding matter used with the non-linear electro-optical material to form an optical waveguide, and where the index of refraction varies with applied electric field across such non-linear electro-optical material. For non-linear electro-optical material that is lithium niobate, the indices of refraction are 2.3 for the ordinary axis and 2.21 for the extraordinary axis. In one embodiment, the non-linear electro-optical material is material having an index of refraction greater than 1.6. Typically, the non-linear electro-optical material can be attached to or deposited on, and patterned on, a substrate, e.g. using semiconductor manufacturing techniques. Such non-linearities of the non-linear electro-optical material may be second order and/or higher order non-linearities. Non-linear electro-optical material includes lithium niobate, lithium tantalate, and electro-polymers.

Optical waveguides illustrated herein are formed by patterning lithium niobate. However, alternatively, the optical waveguides may be formed by diffusing material, e.g. titanium, into the lithium niobate.

The present invention may be used in frequency comb generators and other apparatuses such as electro-optic switches and electro-optic modulators. In one embodiment, an electro-optical modulator including a modified Bragg resonator is formed by a non-linear electro-optical material (having a relatively high index of refraction) on an insulator (having a relatively lower index of refraction). For example, the index of refraction for an insulator that is silicon dioxide is 1.444 at a wavelength of 1.55 microns.

Figures 1A, 1B:
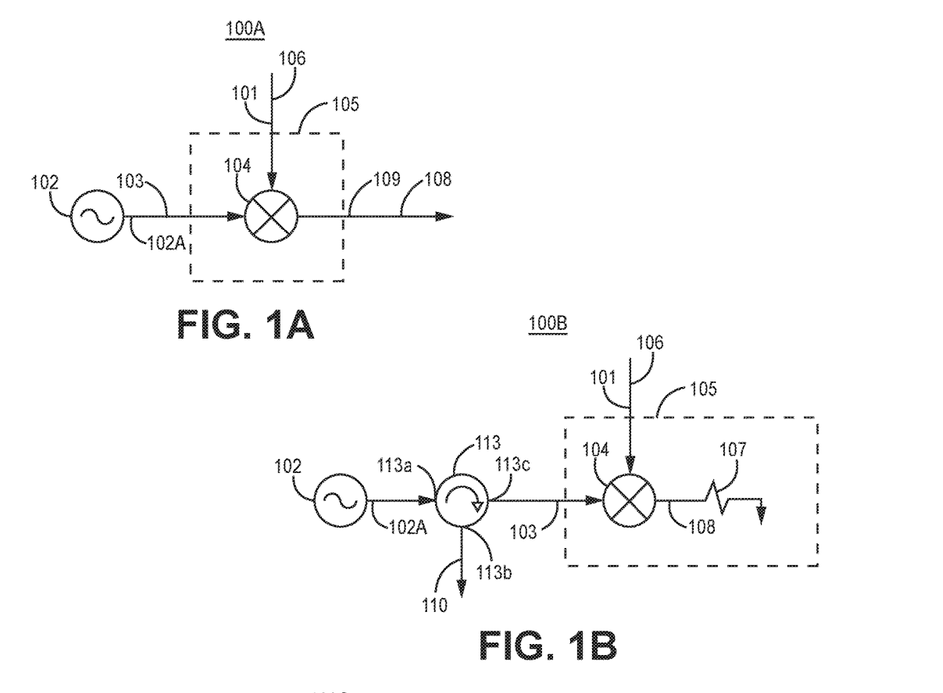
FIG. 1A illustrates a block diagram of one embodiment of a transmittance electro-optical modulation system including a modified Bragg resonator.
FIG. 1B illustrates a block diagram of an embodiment of a reflectance electro-optical modulation system including a modified Bragg resonator.

FIG. 1A illustrates a block diagram of one embodiment of a transmittance electro-optical modulation system including a modified Bragg resonator (transmittance modulation system) 100A. The transmittance electro-optical modulation system including a modified Bragg resonator 100A comprises a modulator with a modified Bragg resonator (modified Bragg resonator modulator) 104 including a first input 103, a second input 106, and an output 108. The transmittance modulation system operates on transmittance principles because a modulated optical signal 109 is transmitted from a port (the output 108) of the modified Bragg resonator modulator 104 that is different from the port (the first input 103) of the modified Bragg resonator modulator 104 into which an optical carrier signal 102A is provided.

The first input 103 is configured to be coupled to an optical source 102, e.g. a LASER such as a vertical-cavity surface emitting LASER or a distributed feedback (DFB) laser, which generates an optical carrier signal 102A having a relatively low phase noise. The optical carrier signal 102A has a frequency which is substantially the same as a resonant frequency of the modified Bragg resonator modulator 104. The modified Bragg resonator modulator 104 will be subsequently described.

The second input 106 is configured to receive an electrical data signal 101 to be modulated on the optical carrier signal 102A. The electrical data signal 101 are applied to the modified Bragg resonator modulator 104 in a manner subsequently discussed. The modified Bragg resonator modulator 104 generates, with the optical carrier signal 102A and the electrical data signal 101, a modulated optical signal 109 that is provided at the output 108.

Optionally, the modified Bragg resonator modulator 104 is placed within a cooling system 105, e.g. used to cool other components, for example Josephson junctions, of a quantum computer. Although not shown as such, the optical source 102 and/or the source of the electrical data signal (not shown) coupled to the second input 106 may also be placed within the cooling system 105.

FIG. 1B illustrates a block diagram of an embodiment of a reflectance electro-optical modulation system including a modified Bragg resonator (first reflectance modulation system) 100B. The first reflectance modulation system 100B is similar to the transmittance modulation system 100A, except for the following. An optical circulator 113 is inserted between the optical source 102 and the modified Bragg resonator modulator 104. The optical circulator 113 receives the optical carrier signal 102A at a first port 113a of the optical circulator 113, and provides a modulated output signal 110 at a second port 113b of the optical circulator 113. The third port 113c of the optical circulator 113 is coupled to the first input 103 of the modified Bragg resonator modulator 104.

The first reflectance modulation system 100B operates on reflection principles because a modulated optical signal 110 is transmitted from a port (the first input 103) of the modified Bragg resonator modulator 104 that is the same port (the first input 103) into which the optical carrier signal 102A is provided. Finally, the other port (the output 108) of the modified Bragg resonator modulator 104 is terminated by an optical termination 107 which either absorbs or otherwise dissipates optical energy emitted from the other port. The optical termination 107 is coupled to the output 108 of the modified Bragg resonator modulator 104. The optical termination 107 may be, for example, a spiral waveguide that emits the light ejected from the other port of the modified Bragg resonator modulator 104. The optical termination 107 may be within or not within the cooling system 105. In one embodiment, the optical termination 107 is co-fabricated (or integrated), e.g. on a substrate, with the modified Bragg resonator modulator 104.

Figure 1C:
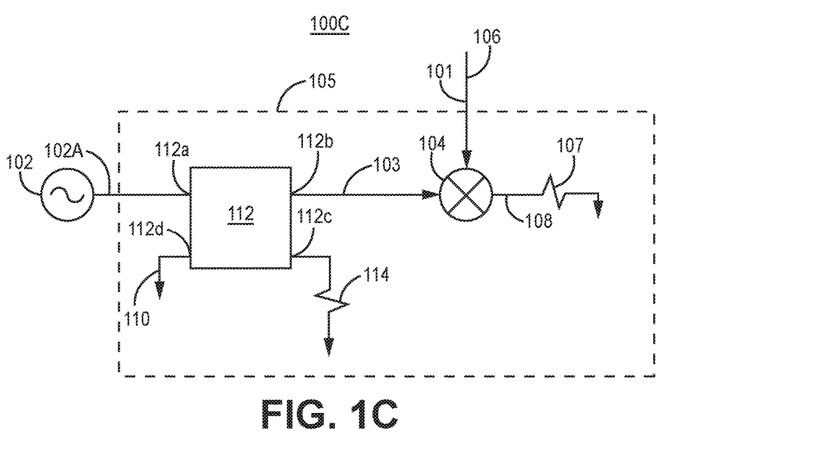
FIG. 1C illustrates a block diagram of another embodiment of a reflectance electro-optical modulation system including a modified Bragg resonator.

FIG. 1C illustrates a block diagram of another embodiment of a reflectance electro-optical modulation system including a modified Bragg resonator (second reflectance modulation system) 100C. The second reflectance modulation system 100C is similar to the first reflectance modulation system 100B except that the modified Bragg resonator modulator 104 is more easily co-fabricated (or integrated) with an optical directional coupler 112 than an optical circulator 113. The optical directional coupler 112 is used in lieu of the optical circulator 113 in the first reflectance modulation system 100B. The optical directional coupler 112 is easier to integrate monolithically with the modified Bragg resonator modulator 104.

The first port 112a of the optical directional coupler 112 is coupled to the optical source 102 and is configured to receive the optical carrier signal 102A. The second port 112b of the optical directional coupler 112 is coupled to the first input 103. The third port 112c of the optical directional coupler is coupled to a second optical termination 114. A modulated optical signal 110 is coupled out of the fourth port 112d of the optical directional coupler; thus, the fourth port 112d serves as an output of the second reflectance modulator 100C. The coupling coefficients of the directional coupler 112 can be designed so that a relatively high percentage of optical energy reflected by the modified Bragg resonator modulator 104 is coupled to the fourth port 112d, and a relatively small percentage of optical energy from the optical carrier signal 102A is coupled to the second optical termination 114. Optionally, in addition to the examples expressly set forth herein, one or more of the components of each of the illustrated electro-optical modulation systems including a modified Bragg resonator may be integrated together, e.g. on a single substrate.

Figure 2:
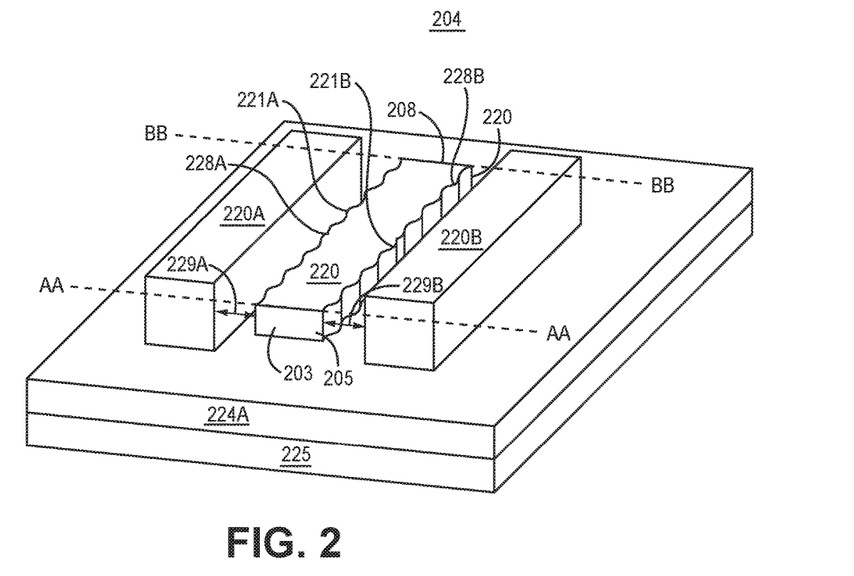
FIG. 2 illustrates a diagram of one embodiment of a modified Bragg resonator modulator.

FIG. 2 illustrates a diagram of one embodiment of a modified Bragg resonator modulator 204. The modified Bragg resonator modulator 204 comprises a non-linear electro-optical material 220 having a first side on an insulator 224A. The non-linear electro-optical material 220 having a first side on an insulator 224A form an unbent optical waveguide. The insulator 224A may be silicon dioxide or another insulator. Optionally, a second insulator (shown in subsequent as 700H in FIG. 7) e.g. silicon dioxide, may be disposed on the non-linear electro-optical material 220; however, the second insulator need not be used. Optionally, the insulator 224A is formed on a substrate 225, e.g. a handle wafer. The substrate 225 may be made from a material such as silicon, lithium niobate, silicon dioxide, calcium fluoride, magnesium oxide, or other materials.

Two opposite edges (a first edge 228A and a second edge 228B) are perpendicular to the first side of the electro-optical material 220. Proximate to both the first edge 228A and the second edge 228B (opposite of the first edge 228A) of the non-linear electro-optical material 220 are respectively a first electrode 220A and a second electrode 220B. The first electrode 220A and the second electrode 220B are the second input 106 illustrated in FIGS. 1A-C.

Optionally, one of the first electrode 220A and the second electrode 220B may be coupled to ground and an electrical data signal 101 that is single ended may be provided to the other electrode. Alternatively, a first conductor of an electrical data signal 101 that is differential may be coupled to the first electrode 220A, and a second conductor corresponding to an electrical data signal 101 that is differential may be coupled to the second electrode 220B.

A Bragg pattern is formed on the first edge 228A and the second edge 228B of the non-linear electro-optical material 220. The first edge 228A and the second edge 228B respectively have periodic surfaces 221A, 221B, e.g. linear surfaces, that are substantially parallel and proximate to a first edge 223A of the first electrode 220A and a first edge 223B of the second electrode 220B. Optionally, the second insulator may also be formed with the same Bragg pattern as the non-linear optical material 220 as shown in FIG. 2.

A first gap 229A and a second gap 229B are respectively the lateral distances between the first edge 228A and the second edge 228B and respectively the first electrode 220A and the second electrode 220B (or edges thereof respectively closest to the first edge 228A and the second edge 228B). Because the first edge 228A and the second edge 228B vary due to the Bragg grating, there may be a first average gap and a second average gap respectively for the first gap 229A and the second gap 229B, where the average gaps are the average of the gap at each point along respectively the first edge 228A and the second edge 228B.

The periodicity of the Bragg pattern determines the center frequency of a band stop frequency range in a transmission path from the first input 203 to the output 208 of the modified Bragg resonator modulator 204. The first input 203 (which may also be referred to more generally herein as an 'input') and the output 208 as used herein shall be defined as follows. The first input 203 is defined by a first edge of non-linear electro-optical material 220 that is substantially perpendicular to the substrate 225, e.g. along line AA. The output 208 is defined by a second edge of non-linear electro-optical material 220 that is substantially perpendicular to the substrate 225, e.g. along line BB. The first edge and the second edge are substantially parallel and opposite one another.

A modified Bragg resonator means a Bragg resonator having Bragg gratings that undergo substantially a π phase shift substantially at the center of the Bragg resonator grating(s) where two gratings abut. A Bragg grating is a form of a reflector. Due to constructive interference, the π phase shift creates a band pass resonance at the center frequency of the band stop frequency range and creates a resonance with a spatial distribution confined to a central portion (e.g. around the subsequently described first center and second center where the π phase shift occurs) of a coupled reflector, e.g. grating, system. The Q of the band pass resonance can be adjusted by varying the number of grating periods in the modified Bragg resonator modulator 204. The Q of the band pass resonance is also dependent upon the loss of the gratings. In one embodiment, the Q factor of the modified Bragg resonator modulator 204 is 20,000.

The illustrated modified Bragg resonator 205 is a planar modified Bragg resonator comprising the nonlinear optical material 220, the first insulator 224A, and optionally the second insulator. For the illustrated modified Bragg resonator 205, substantially midway along each of the edges 228A, 228B (between the first input 203 and the output 208) of the non-linear electro-optical material 220, the Bragg pattern undergoes substantially a π phase shift where two gratings abut.

Figure 3:
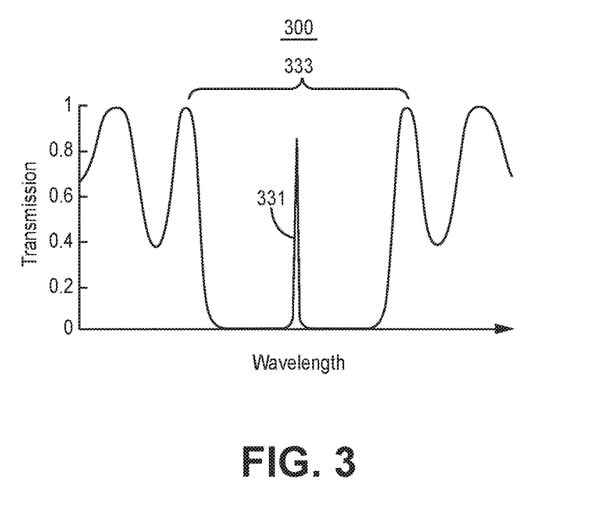
FIG. 3 illustrates a plot of a transmission spectrum of one embodiment of between a first input and an output of a modified Bragg resonator modulator.

FIG. 3 illustrates a plot of a transmission spectrum of one embodiment of between the first input and the output of a modified Bragg resonator modulator 300. A band stop frequency range 333 and a high Q band pass resonance 331 are illustrated in FIG. 3.

For the different embodiments of the modified Bragg resonator modulators described herein, the optical source 102 emits an optical carrier signal 102A having a frequency nearly equal to the high Q band pass resonance 331 for a first electric field applied across the first electrode 220A and the second electrode 220B, and thus the non-linear electro-optical material 220.

An electrical signal, e.g. a data signal, of varying voltage is applied across the first electrode 220A and the second electrode 220B. Thus, a varying electromagnetic field is applied across the non-linear electro-optical material 220 by the first electrode 220A and the second electrode 220B. The change of index of refraction of the non-linear electro-optical material 220 varies proportionally with the change in electric field across the first electrode 220A and the second electrode 220B. When the index of refraction varies, the center frequency of the narrow band pass resonance also varies, moving either closer to the carrier signal or farther away.

Figure 4A:
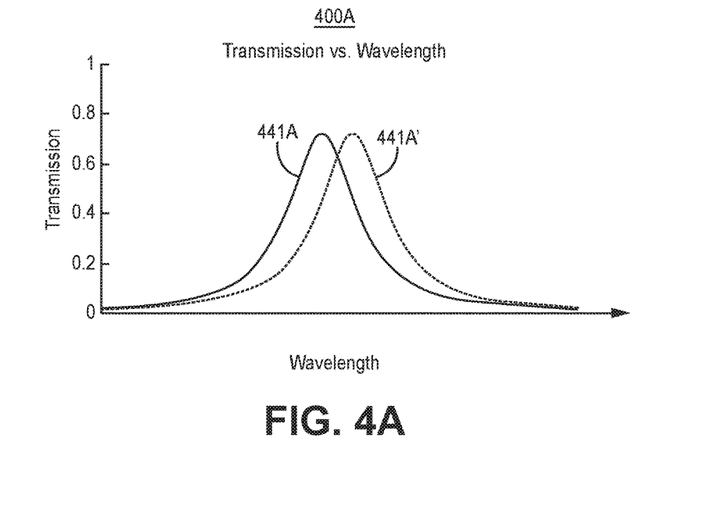
FIG. 4A illustrates plots of one embodiment of transmission spectra between an input and an output of a modified Bragg resonator modulator.
Figure 4B:
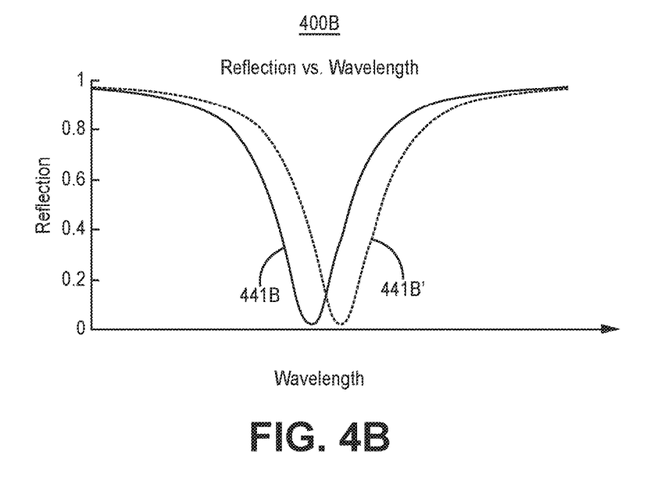
FIG. 4B illustrates plots of one embodiment of reflection spectra at an input of a modified Bragg resonator modulator.

FIG. 4A illustrates plots of one embodiment of transmission spectra between an input and an output of a modified Bragg resonator modulator 400A. The first transmission spectrum 441A and the second transmission spectrum 441A' result respectively from the first electric field and a second electric field being applied across the first electrode 220A and the second electrode 220B. FIG. 4B illustrates plots of one embodiment of reflection spectra at an input of a modified Bragg resonator modulator 400B. The first reflection spectrum 441B and the second transmission spectrum 441B' result respectively from the first electric field and the second electric field being applied across the first electrode 220A and the second electrode 220B.

For reflectance modulation systems, including a modified Bragg resonator, when the electric field is varied from the first electric field to the second electric field, a dynamic range of power reflected at the input of the modified Bragg resonator 205 is substantially greater than a corresponding dynamic range for a comparable transmission modulation system including modified Bragg resonator. Because reflectance modulation systems, including a modified Bragg resonator, have a substantially greater dynamic range than a comparable transmission modulation system including modified Bragg resonator, the reflectance modulation systems, including a modified Bragg resonator, have a substantially greater modulation index than a comparable transmission modulation system including modified Bragg resonator. Thus, the reflectance modulation systems, including a modified Bragg resonator, desirably consume less energy than a comparable transmission modulation system including modified Bragg resonator.

Figure 5A:
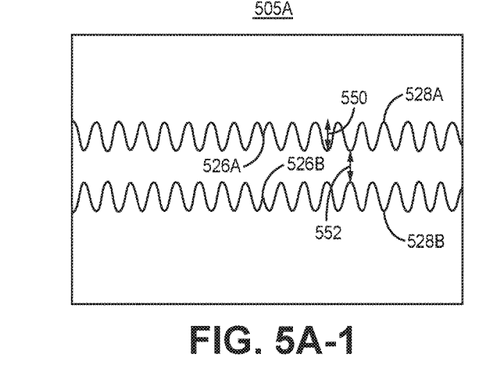

FIG. 5A-1 illustrates a plan view of one embodiment of a modified Bragg resonator (first modified Bragg resonator) 505A. The first modified Bragg resonator 505A is not apodized. The first embodiment of the modified Bragg resonator 505A is patterned with Bragg grating on each of a first edge 528A and a second edge 528B. In one embodiment, the period of each grating of the Bragg gratings along the first edge 528A and the second edge 528B is about 500 nm.

A first center 526A, where two Bragg gratings abut, of first Bragg gratings on the first side 528A undergoes substantially a π phase shift. A second center 526B, where two Bragg gratings abut, of a second Bragg grating on the second side 528B undergoes substantially a π phase shift. Each Bragg grating has a modulation depth 550. As will be shown, the modulation depth 550 can vary by Bragg grating.

Figure 5A:
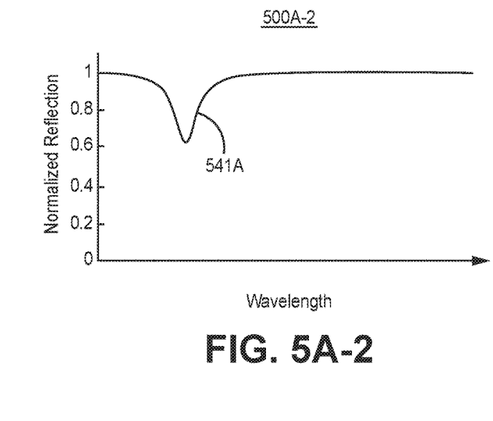

The first modified Bragg resonator 505A has a minimum width 552, and a maximum width that is the sum of the minimum width 552 and the modulation depth 550. The average depth is one half of the sum of the minimum width 552 and the maximum width. FIG. 5A-2 illustrates a plot of one embodiment of a reflection spectrum for the first modified Bragg resonator 500A-2 that is not apodized; the reflection spectrum occurs when a first electric field is applied across the electrodes 220A, 220B. The modified Bragg resonator 505A has a first reflectance resonance 541A with a relatively low Q.

Figure 5B:
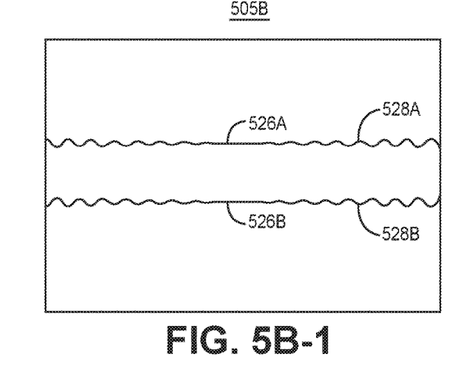

FIG. 5B-1 illustrates a plan view of another embodiment of a modified Bragg resonator (second modified Bragg resonator) 505B. The second modified Bragg resonator 505B is similar to the first modified Bragg resonator 505A, except that the shapes of the Bragg gratings on the first edge 528A and the second edge 528B have been apodized to reduce modulation depth proximate to the centers of both Bragg gratings where the substantially π phase shifts occur. The reduction in modulation depth of the Bragg grating reduces scattering loss of the Bragg gratings, which enhances the Q of the second modified Bragg resonator. Still, each of the Bragg grating undergoes substantially a π phase shift at the corresponding centers 526A, 526B; at each center two Bragg gratings abut.

Figure 5B:
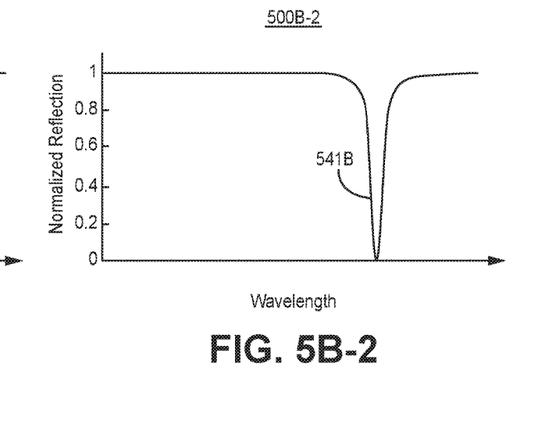

FIG. 5B-2 illustrates a plot of one embodiment of a reflection spectrum for the second modified Bragg resonator 500B-2 that is apodized; the reflection spectrum occurs when a first electric field is applied across the electrodes 220A, 220B. The apodized Bragg gratings have lower loss, and as a result of the second modified Bragg resonator 505B has a second reflectance resonance 541B with a Q higher than the Q of the first reflectance resonance 541A of the first modified Bragg resonator 505A. As a result, the modulation index of the second modified Bragg resonator 505B with apodization is greater than the modulation efficiency of the first modified Bragg resonator 505A.

In one embodiment, apodization of the Bragg gratings can be performed by changing the modulation depth linearly or non-linearly (e.g. with a generalized polynomial function). In another embodiment, the apodization of the Bragg gratings on the first edge 528A and the second edge 528B commences at the input 203 and output 208 of the modified Bragg resonator 205; alternatively, the apodization commences at a distance displaced from the input 203 and output 208 so that not all Bragg gratings are apodized. Apodization distance means the distance from where apodization commences on an edge (e.g. the first edge 528A or the second edge 528B) to the center 526A, 526B (e.g. where the π phase shifts occurs) of the corresponding edge. In a further embodiment, the two apodization distances on one edge are equal, and the apodization distances on the two edges 528A, 528B are equal. The maximum apodization distance is the distance from the centers 526A, 526B to respectively the input 203 and the output 208 of the modified Bragg resonator. However, as will be subsequently described, a shorter apodization distance may be preferable. In yet another embodiment, the modulation depth 550 can be zero at the center;

Other techniques for increasing the Q, and thus the modulation index, of a modified Bragg resonator, e.g. made from lithium niobate, include performing high temperature annealing just below the Curie temperature of the non-linear electro-optical material 220. Such annealing causes the edges 228A, 228B to reflow and become smoother, reducing insertion loss and increasing Q. When annealing at high temperatures (e.g. about 1130 C), depending upon how brittle the non-linear electro-optical material 220 is, at least the substrate 225 may have to have a temperature coefficient of expansion (TCE) similar to the TCE of the non-linear electro-optical material 220; for non-linear electro-optical material 220 that is lithium niobate, a substrate 225 of magnesium oxide or calcium fluoride may be used because magnesium oxide and calcium fluoride have TCE substantially equal to the TCE of lithium niobate.

The length of the optical resonance (along the axis running from the input 203 to the output 208) in the modified Bragg resonator, and thus the length of the first electrode 220A and second electrodes 220B parallel to the same axis, can be desirably reduced using one of the following techniques. Reduction of such length desirably reduces electrode capacitance, and thus the amount of energy required to perform modulation. The techniques to reduce the length of the optical resonance include:

a. using a shorter apodization distance from the center of each Bragg grating towards each end, i.e. the input 203 and output 208, of the modified Bragg resonator, e.g. reduced from 8 guided wavelengths to 4 guided wavelengths, thereby providing further reduction to the length of the optical resonance;

b. reducing the maximum width of the modified Bragg resonator from approximately 0.6 to approximately 0.1-0.2 free-space wavelengths;

c. increasing the maximum modulation depth of the grating, e.g. from approximately 0.2 to approximately 0.4 free-space wavelengths; and d. reducing the wavelength of the optical carrier signal 102A and the high Q band pass resonance 331, e.g. from 1550 nm to 1064 nm or 780 nm.

Elements a.-c. also increase grating strength. Element d. increases grating strength if the length of the modified Bragg resonator is held constant. Further, the change in the refractive index for a given change in electric field, e.g. voltage, across the electrodes and a shift of the resonance in the frequency domain can both be increased by reducing the first average gap and the second average gap. In one embodiment, the first average gap and the second average gape are each six microns, but this can be reduced to four microns or lower. The electric field generated by the application of voltage across the first electrode 220A and the second electrodes 220B must overlap spatially with the majority of the electric field of the optical resonance.

Figure 6:
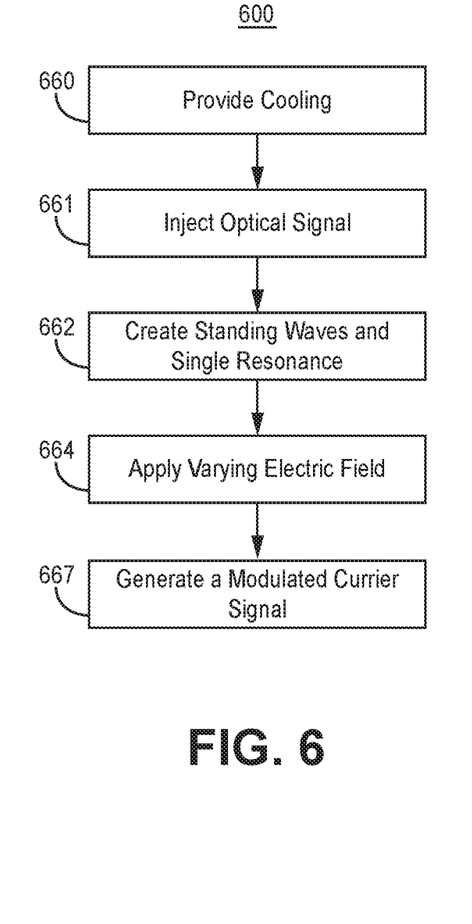
FIG. 6 illustrates an exemplary method of operation of a modified Bragg resonator.

FIG. 6 illustrates an exemplary method of operation of a modified Bragg resonator 600. To the extent the method 600 shown in FIG. 6 is described herein as being implemented in the devices shown in FIGS. 1A through 5, it is to be understood that other embodiments can be implemented in other ways. The blocks of the flow diagrams have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner).

Optionally, in block 660, provide cooling to an unbent optical waveguide between two reflectors. In one embodiment, the unbent optical waveguide is a planar optical waveguide. For example, provide cooling to between about 0K and about 273K, near 0K, between about 0K and about 4.2K, or between about 63K and about 73.2K. An example of such an unbent optical waveguide is illustrated in FIG. 2 and correspondingly describe above.

In block 661, inject an optical carrier signal into an unbent optical waveguide between two reflectors, where the distance between two reflectors in the center of the two reflectors is zero and the two reflectors undergo a π phase shift where the two reflectors are adjacent. The previously illustrated Bragg gratings are distributed implementations of the two reflectors. Optionally, the reflectors are Bragg gratings, however, alternatively they can be mirrors.

In block 662, create standing waves between the two reflectors in the center, and a single resonance due to constructive interference. The resonance wavelength for two reflectors (undergoing a π phase shift where the two reflectors are adjacent) is $\Lambda$ (grating period)*$2*n_{eff}$ (effective index of refraction). For example, the resonance wavelength for at least two Bragg grating (undergoing a π phase shift where the two reflectors are adjacent) corresponds to the Bragg grating period. The quality factor, or Q, of the resonance, depends upon the reflectivity of the reflectors. In block 664, apply a varying electric field, e.g. to electrodes, across the unbent optical waveguide between two reflectors. In one embodiment, the varying electric field is applied centered between the two reflectors and extends a length less than or equal to a combined length of the two reflectors. For example, the combined length (as illustrated in FIG. 2) is the length along the non-linear electro-optical material 220 between axes AA and BB. In block 667, generate a modulated carrier signal at at least one of an input and an output of the unbent optical waveguide between the two reflectors.

Figure 7:
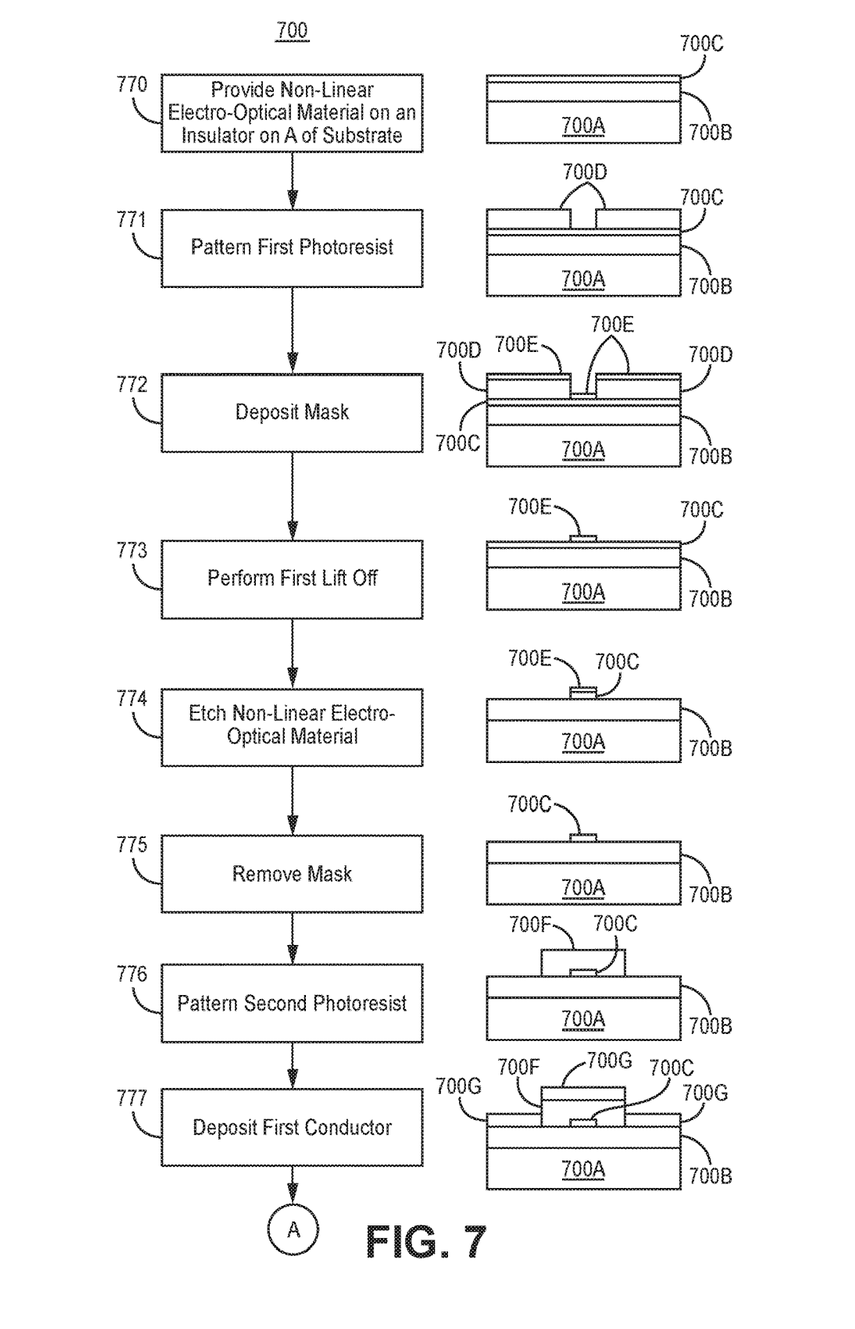
FIG. 7 illustrates an exemplary method of making modified Bragg resonator.

FIG. 7 illustrates an exemplary method of making modified Bragg resonator 700. To the extent the method 700 shown in FIG. 7 is described herein as being implemented in the devices shown in FIGS. 1A through 5, it is to be understood that other embodiments can be implemented in other ways. The blocks of the flow diagrams have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner).

In block 770, provide a non-linear electro-optical material 700C on (e.g. bonded to or deposited on) a first insulator 700B (e.g. silicon dioxide) on a substrate 700A (e.g. a silicon substrate) (provide non-linear electro-optical material on an insulator on a substrate). In block 771, a first photoresist 700D is deposited on the non-linear electro-optical material 700C, and patterned, e.g. by exposing a portion of the first photoresist 700D with deep ultra violet, electron beam, and/or X-ray lithography and removing either the exposed or unexposed portion of the first photoresist 700D to pattern the electro-optical material 700C (pattern first photoresist to define the non-linear electro-optical material). Photoresist as used herein shall include resist used in electron beam, deep ultra violet, and/or X-ray lithography. Photoresist described herein may be deposited by spin or spray coating. The patterning of the electro-optical material 700C defines reflectors, e.g. Bragg gratings, (apodized or not) on what will subsequently be the edges of the remaining portion of non-linear electro-optical material 700C. As a result, a portion of the non-linear electro-optical material 700C is exposed, e.g. accessible, through an opening in the first photoresist 700D which has been patterned (i.e. where the first photoresist 700D has been removed).

In block 772, deposit a mask on non-linear electro-optical material 700C and the first photoresist 700D. The mask 700E may be a metal or another layer of photoresist. For example, if the mask 700E is metal, then optionally it may be deposited by physical vapor deposition, over the first photoresist 700D and the exposed portion of the non-linear electro-optical material 700C. In block 773, perform first lift off; the first photoresist 700D is removed, e.g. chemically removed, thus lifting off and removing the mask 700E above the first photoresist 700D.

In block 774, etch the non-linear electro-optical material 700C. The portion of the non-linear electro-optical material 700C not covered by the mask 700E is removed, e.g. by etching such as reactive ion etching. This forms what is known as a "ridge waveguide." Although block 774 illustrates that all of the non-linear electro-optical material 700C not covered by the mask has been removed, this need not be the case.

Alternatively, only a portion of the non-linear electro-optical material 700C is removed. This forms what is known as a "ribbed waveguide." Thus, each electrode could be subsequently formed on non-linear electro-optical material 700C and/or the first insulator 700B.

Subsequently, in block 775, remove the remaining portion of the mask material. The remaining portion of the mask material 700E is removed, e.g. by etching such as chemical etching. Optionally, in this block or elsewhere during the method, anneal the patterned non-linear electro-optical material 700C as described elsewhere.

In block 776, a second photoresist 700F is deposited on the non-linear electro-optical material 700C and first insulator 700B, and patterned, e.g. by exposing a portion of the second photoresist 700F with deep ultra violet, electron beam, or X-ray lithography and removing either the exposed or unexposed portion of the second photoresist 700F (pattern the second photoresist to define electrodes). The patterning defines regions of the first insulator 700B where the aforementioned first electrode 220A and the second electrode 220B will be deposited. In one embodiment, at least two portions of the first insulator 700B are exposed where second photoresist 700F has been removed.

In block 777, deposit a first conductor 700G (for example a metal like gold, silver, or copper), e.g. by physical vapor deposition, over the remaining second photoresist 700F and an at least one exposed portion of the first insulator 700B. In block 778, perform second lift off; the second photoresist 700F is removed, e.g. chemically removed, thus lifting off and removing the first conductor 700G above the second photoresist 700F. The remaining first conductor 700G over the first insulator 700B forms the aforementioned first electrode 220A and the second electrode 220B.

Optionally, in block 779, deposit a second insulator 700H, e.g. with low pressure or plasma enhanced chemical vapor deposition, over the first conductor 700G, the first insulator 700B, and the non-linear electro-optical material 700C. In one embodiment, the first insulator 700B and the second insulator 700H are the same material, e.g. silicon dioxide. The index of refraction of the non-linear electro-optical material 700C is relatively larger than the index of refraction of each of the first insulator 700B and the second insulator 700H; thus the first insulator 700B (and the second insulator 700H when used) confine the optical signal within the non-linear electro-optical material 700C. The second insulator 700H also protects the non-linear electro-optical material 700C. Particularly if the first insulator 700B and the second insulator 700H have similar indices of refraction, then symmetric optical modes will propagate in the modified Bragg resonator.

In block 780, deposit a third photoresist 700I over the second insulator 700H, and pattern, e.g. by exposing a portion of the third photoresist 700I with deep ultra violet, electron beam, or X ray lithography and removing either the exposed or unexposed portion of the third photoresist 700I (pattern third photo resist to define contacts). The patterning defines regions of the second insulator 700H where contacts to the electrodes will be deposited.

In block 782, remove at least one portion of exposed second insulator 700H, e.g. by etching such as reactive ion etching. In block 784, the remaining third photoresist 700I is removed, e.g. chemically removed.

In block 786, deposit a fourth photoresist 700J over the second insulator 700H, and pattern the fourth photoresist 700J, e.g. by exposing a portion of the fourth photoresist 700J with deep ultra violet, electron beam, or X ray lithography and removing either the exposed or unexposed portion of the fourth photoresist 700J (pattern fourth photo resist to define bond pads). Each bond pad is electrically coupled to an electrode by a contact. In one embodiment, at least two portions first conductor 700G (and optionally of the second insulator 700H) are exposed, e.g. accessible, through the remaining fourth photoresist 700J.

In block 788, deposit a second conductor 700K on the fourth photoresist 700J, at least one portion of exposed first conductor 700G, and optionally the second insulator 700H. The second conductor may be a metal such as gold, aluminum, or copper, and may be deposited by physical vapor deposition. Optionally, the first conductor 700G and the second conductor 700K are the same material. In block 790, perform third lift off; the fourth photoresist 700J is removed, e.g. chemically removed, thus lifting off and removing the second conductor 700K above the fourth photoresist 700J. The remaining second conductor 700K on the first conductor 700G and/or on the optional second insulator 700H forms a first contact and a second contact respectively to the aforementioned first electrode 220A and the second electrode 220B.

Optionally, the upper and lower cladding layers formed by the first insulator 700B and the optional second insulator 700H are each about 2 microns thick, and the non-linear electro-optic waveguide, formed by the non-linear electro-optical material is about 1 micron wide and about 300 to 700 nanometers thick; however material dimensions may differ from the foregoing. In another embodiment, the first insulator 700B and the optional second insulator greater than 500 nm (e.g. 2 microns), and the non-linear electro-optical material is greater than 200 nm (e.g. 600-700 microns) thick.

Figure 8A:
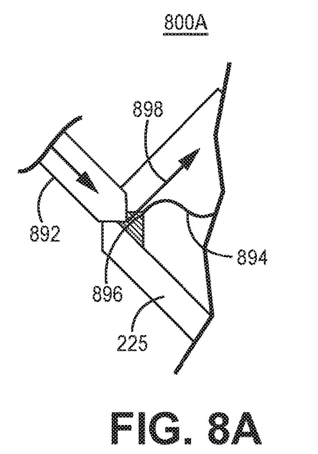
FIG. 8A illustrates one embodiment of a grating assisted coupler.

As discussed above, a reflectance modulation system is susceptible to internal reflections, e.g. at device interfaces. To diminish such reflections, e.g. between the circulator 113 and the modulator with a modified Bragg resonator modulator 104 in one of the aforementioned reflectance systems, a grating assisted coupler can be employed. FIG. 8A illustrates one embodiment of a grating assisted coupler 800A. The illustrated grating assisted coupler 800 is formed by a first optical waveguide 892, e.g. an optical fiber waveguide, orthogonally coupled to a corresponding second optical waveguide 894, e.g. a planar optical waveguide, at a cleaved portion 896 of a substrate 225 and the second optical waveguide 894. However, the first optical waveguide 892 need not be orthogonally coupled to the corresponding second optical waveguide 894; the angle between these two waveguides may range from substantially zero (i.e. just greater than zero) to ninety degrees. Reflections 898 from the second optical waveguide 894 on the substrate 225 are directed away from the first optical waveguide 892, thus diminishing undesirable reflections within the first optical waveguide 892, and the corresponding reflectance electro-optical modulation system. The two waveguides should be oriented to one another so that specular reflections do not enter either waveguide.

Figure 8B:
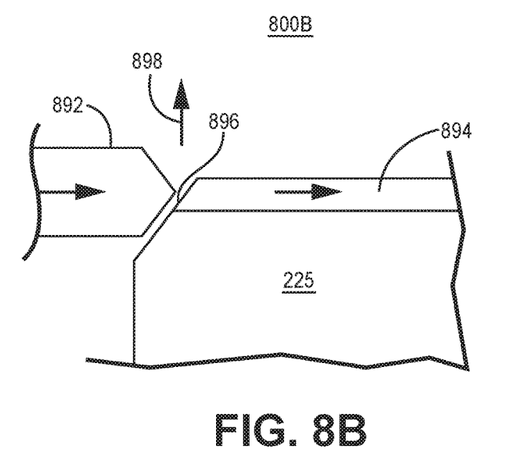
FIG. 8B illustrates one embodiment of a polished butt coupler.

Alternatively, a polished butt coupler can be utilized in lieu of a grating assisted coupler. FIG. 8B illustrates one embodiment of a polished butt coupler 800B. A cleaved end of a first optical waveguide 892, e.g. an optical fiber waveguide, is coupled to a cleaved portion of the substrate 225 and a cleaved portion of a second optical waveguide 894, e.g. a planar optical waveguide. Reflections 898 from the second optical waveguide 894 on the substrate 225 are directed orthogonally away from the first optical waveguide 892, thus diminishing reflections within the first optical waveguide 892, and the corresponding reflectance electro-optical modulation system.

Terms of relative position as used in this application are defined based on a plane parallel to, or in the case of the term coplanar—the same plane as, the conventional plane or working surface of a device, layer, wafer, or substrate, regardless of orientation. The term "horizontal" or "lateral" as used in this application are defined as a plane parallel to the conventional plane or working surface of a device, layer, wafer, or substrate, regardless of orientation. The term "vertical" refers to a direction perpendicular to the horizontal. Terms such as "on," "side" (as in "sidewall"), "higher," "lower," "over," "top," and "under" are defined with respect to the conventional plane or working surface being on the top surface of a device, layer, wafer, or substrate, regardless of orientation. The term "coplanar" as used in this application is defined as a plane in the same plane as the conventional plane or working surface of a device, layer, wafer, or substrate, regardless of orientation.

A number of examples defined by the following claims have been described. Nevertheless, it will be understood that various modifications to the described examples may be made without departing from the spirit and scope of the claimed invention. Therefore, it is manifestly intended that this invention be limited only by the claims and the equivalents thereof.

Example Embodiments

Example 1 includes an apparatus, comprising: a substrate; a first insulator on at least a portion of the substrate; a non-linear electro-optical material having a side on the at least a portion of the first insulator, and a first edge and a second edge; where the first insulator and the non-linear electro-optical material form an unbent optical waveguide having an input and an output; wherein the first edge has a Bragg grating with substantially a $\pi$ phase shift substantially in the center of the Bragg grating; wherein the Bragg grating on the first edge has periodic surfaces which are substantially perpendicular to the side of the non-linear optical material; wherein the second edge has a Bragg grating with substantially a $\pi$ phase shift substantially in the center of the Bragg grating; wherein the Bragg grating on the second edge has periodic surfaces which are substantially perpendicular to the side of the non-linear optical material; a first electrode having a side over the substrate and having an edge substantially perpendicular to the periodic surfaces of the Bragg grating on the first edge; and a second electrode having a side over the substrate and having an edge substantially perpendicular to the periodic surfaces of the Bragg grating on the non-linear electro-optical material.

Example 2 includes the apparatus of Example 1, wherein the non-linear electro-optical material has another side opposite the side; and a second insulator is on the other side.

Example 3 includes the apparatus of Example 1, wherein the non-linear electro-optical material comprises lithium niobate.

Example 4 includes the apparatus of any of Examples 2-3, wherein the first insulator is silicon dioxide and the second insulator is silicon dioxide.

Example 5 includes the apparatus of any of Examples 1-4, wherein at least a portion of each Bragg grating is apodized.

Example 6 includes the apparatus of any of Examples 1-5, wherein the first electrode and the second electrode are configured to receive a data signal that is a differential data signal.

Example 7 includes the apparatus of any of Examples 1-6, further comprising a cooling system enclosing the substrate, the first insulator, the non-linear electro-optical material, the first electrode, and the second electrode.

Example 8 includes the apparatus of any of Examples 1-7, wherein the input is configured to receive an optical carrier signal; wherein at least one of the first electrode and the second electrode are configured to receive a data signal; and wherein the output is configured to provide a modulated optical signal.

Example 9 includes the apparatus of any of Examples 1-8, further comprising an optical circulator having a first port, a second port, and a third port; wherein the third port is coupled to the input; wherein the first port is configured to receive an optical carrier signal; wherein the second port is configured to provide a modulated optical signal; wherein at least one of the first electrode and the second electrode are configured to receive a data signal; and wherein the output is coupled to an optical termination on the substrate.

Example 10 includes the apparatus of any of Examples 1-9, further comprising an optical directional coupler comprised of optical waveguide formed over the substrate; wherein the optical directional coupler has a first port, a second port, a third port, and a fourth port; wherein the second port is coupled to the input; wherein a first optical termination on the substrate is coupled to the output; wherein a second optical termination on the substrate is coupled to the third port; wherein the first port is configured to receive an optical carrier signal; wherein the first electrode and the second electrode are configured to receive a data signal; and wherein the fourth port is configured to provide a modulated optical signal.

Example 11 includes the apparatus of Example 10, further comprising a cooling system enclosing the substrate, the first insulator, the non-linear electro-optical material, the first electrode, the second electrode, the first optical termination, the second optical termination, and the optical directional coupler.

Example 12 includes a method, comprising: injecting an optical carrier signal into an unbent optical waveguide between two reflectors, where the distance between two reflectors in the center of the two reflectors is substantially zero and the two reflectors undergo substantially a $\pi$ phase shift where the two reflectors are adjacent; creating standing waves between the two reflectors in the center, and a single resonance due to constructive interference; applying a varying electric field across the unbent optical waveguide centered between two reflectors and extending a length less than or equal to a combined length of the two reflectors; and generating a modulated carrier signal at at least one of an input and an output of the unbent optical waveguide between the two reflectors.

Example 13 includes the method of Example 12, further comprising providing cooling to the unbent optical waveguide between the two reflectors.

Example 14 includes the method of any of Examples 12-13, wherein injecting the optical carrier signal into the unbent optical waveguide between the two reflectors comprises injecting the optical carrier signal into the unbent waveguide between at least two Bragg gratings, where the distance between two Bragg gratings in the center of the at least two Bragg gratings is substantially zero and the two Bragg gratings undergo substantially a $\pi$ phase shift where the two Bragg gratings are adjacent.

Example 15 includes a method, comprising: providing non-linear electro-optical material on an insulator on a substrate; patterning a first photoresist configured to define the non-linear electro-optical material having two reflectors, where the distance between two reflectors in the center of the two reflectors is substantially zero and the two reflectors undergo substantially a $\pi$ phase shift where the two reflectors are adjacent to where a portion of the two reflectors are apodized; depositing a mask on non-linear electro-optical material and the first photoresist; performing lift off to remove the first photo resist and the mask above the first photoresist; etching the non-linear electro-optical material; removing a remaining portion of the mask material; patterning a second photoresist to define at least one electrode; depositing a first conductor over the second photoresist and at least one exposed portion of the first insulator; removing remaining the second photoresist; patterning a third photoresist over the second insulator; removing at least one portion of exposed second insulator; removing remaining third photoresist; patterning a fourth photoresist over the second insulator; depositing a second conductor on at least one of the fourth photoresist, at least one portion of exposed first conductor, and the second insulator; and performing lift off to remove the fourth photoresist and the second conductor above the fourth photoresist.

Example 16 includes the method of Example 15, wherein etching the non-linear electro-optical material comprises etching only a portion of the non-linear electro-optical material not covered by the mask.

Example 17 includes the method of any of Examples 15-16, further comprising depositing a second insulator over at least one of the first conductor, the first insulator, and the non-linear electro-optical material.

Example 18 includes the method of any of Examples 15-17, further comprising annealing the non-linear electro-optical material, at a temperature just below the Curie temperature of the non-linear electro-optical material, after the non-linear electro-optical material has been patterned by etching.

Example 19 includes the method of any of Examples 15-18, wherein patterning the first photoresist configured to define the non-linear electro-optical material having two reflectors, where a distance between two reflectors in the center of the two reflectors is substantially zero and the two reflectors undergo substantially a $\pi$ phase shift where the two reflectors are adjacent to where the portion of the two reflectors are apodized comprises patterning the first photoresist configured to define the non-linear electro-optical material having two reflectors where all of the two reflectors are apodized.

Example 20 includes the method of any of Examples 15-19, wherein providing the non-linear electro-optical material on the insulator on the substrate comprises providing lithium niobate on silicon dioxide on a silicon substrate.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:
1. An apparatus, comprising:
a substrate;
a first insulator on at least a portion of the substrate;
a non-linear electro-optical material having a side on the at least a portion of the first insulator, and a first edge and a second edge;
where the first insulator and the non-linear electro-optical material form an unbent optical waveguide having an input and an output;
wherein the first edge has a Bragg grating with substantially a $\pi$ phase shift substantially in the center of the Bragg grating;
wherein the Bragg grating on the first edge has periodic surfaces which are substantially perpendicular to the side of the non-linear optical material;
wherein the second edge has a Bragg grating with substantially a $\pi$ phase shift substantially in the center of the Bragg grating;
wherein the Bragg grating on the second edge has periodic surfaces which are substantially perpendicular to the side of the non-linear optical material;
a first electrode having a side over the substrate and having an edge substantially perpendicular to the periodic surfaces of the Bragg grating on the first edge; and
a second electrode having a side over the substrate and having an edge substantially perpendicular to the periodic surfaces of the Bragg grating on the non-linear electro-optical material.

2. The apparatus of claim 1, wherein the non-linear electro-optical material has another side opposite the side; and
a second insulator is on the other side.

3. The apparatus of claim 1, wherein the non-linear electro-optical material comprises lithium niobate.

4. The apparatus of claim 2, wherein the first insulator is silicon dioxide and the second insulator is silicon dioxide.

5. The apparatus of claim 1, wherein at least a portion of each Bragg grating is apodized.

6. The apparatus of claim 1, wherein the first electrode and the second electrode are configured to receive a data signal that is a differential data signal.

7. The apparatus of claim 1, further comprising a cooling system enclosing the substrate, the first insulator, the non-linear electro-optical material, the first electrode, and the second electrode.

8. The apparatus of claim 1, wherein the input is configured to receive an optical carrier signal;
wherein at least one of the first electrode and the second electrode are configured to receive a data signal; and
wherein the output is configured to provide a modulated optical signal.

9. The apparatus of claim 1, further comprising an optical circulator having a first port, a second port, and a third port;
wherein the third port is coupled to the input;
wherein the first port is configured to receive an optical carrier signal;
wherein the second port is configured to provide a modulated optical signal;
wherein at least one of the first electrode and the second electrode are configured to receive a data signal; and
wherein the output is coupled to an optical termination on the substrate.

10. The apparatus of claim 1, further comprising an optical directional coupler comprised of optical waveguide formed over the substrate;
wherein the optical directional coupler has a first port, a second port, a third port, and a fourth port;
wherein the second port is coupled to the input;
wherein a first optical termination on the substrate is coupled to the output;
wherein a second optical termination on the substrate is coupled to the third port;
wherein the first port is configured to receive an optical carrier signal;
wherein the first electrode and the second electrode are configured to receive a data signal; and
wherein the fourth port is configured to provide a modulated optical signal.

11. The apparatus of claim 10, further comprising a cooling system enclosing the substrate, the first insulator, the non-linear electro-optical material, the first electrode, the second electrode, the first optical termination, the second optical termination, and the optical directional coupler.

12. A method, comprising:
injecting an optical carrier signal into an unbent optical waveguide between two reflectors, where the distance between two reflectors in the center of the two reflectors is substantially zero and the two reflectors undergo substantially a $\pi$ phase shift where the two reflectors are adjacent;

creating standing waves between the two reflectors in the center, and a single resonance due to constructive interference;

applying a varying electric field across the unbent optical waveguide centered between two reflectors and extending a length less than or equal to a combined length of the two reflectors; and generating a modulated carrier signal at at least one of an input and an output of the unbent optical waveguide between the two reflectors.

13. The method of claim 12, further comprising providing cooling to the unbent optical waveguide between the two reflectors.

14. The method of claim 12, wherein injecting the optical carrier signal into the unbent optical waveguide between the two reflectors comprises injecting the optical carrier signal into the unbent waveguide between at least two Bragg gratings, where the distance between two Bragg gratings in the center of the at least two Bragg gratings is substantially zero and the two Bragg gratings undergo substantially a $\pi$ phase shift where the two Bragg gratings are adjacent.

* * * * *